Figure 1:
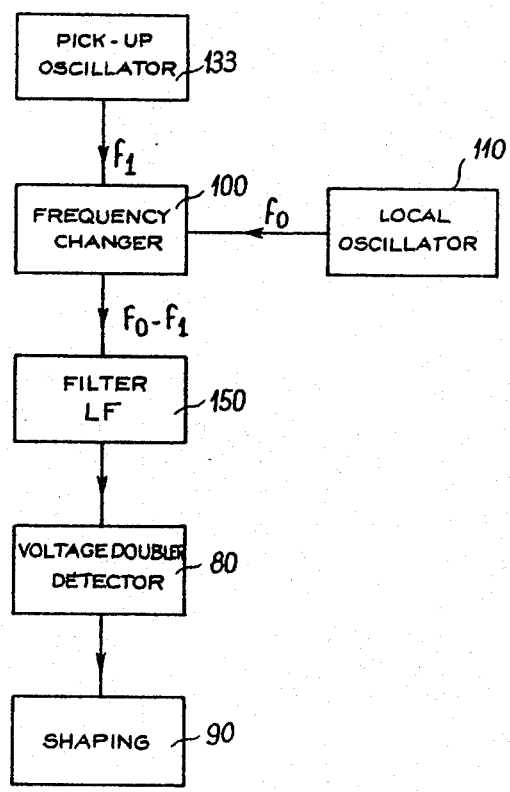

United States Patent [19]
Sibeud

[11] 3,789,381
[45] Jan. 29, 1974

[54] DEVICE FOR MEASURING THE SPECIFIC CONSUMPTION OF INTERNAL COMBUSTION ENGINES

[75] Inventor: Jean Paul Sibeud, Lyon, France

[73] Assignee: Automobiles M. Berliet, Lyon, France

[22] Filed: Aug. 30, 1972

[21] Appl. No.: 284,711

Related U.S. Application Data

[62] Division of Ser. No. 43,790, June 5, 1970.

[30] Foreign Application Priority Data
June 6, 1969 France .............................. 69/18802
Feb. 11, 1970 France .............................. 70/04845

[52] U.S. Cl. .......................... 340/207 R, 340/195
[51] Int. Cl. ..................... G08c 19/12, G08c 19/06
[58] Field of Search ................ 340/207 R, 195, 200

[56] References Cited
UNITED STATES PATENTS
3,140,608  7/1964  Clark .................................. 340/200
3,170,113  2/1965  Harmon ......................... 340/207 R Primary Examiner—Thomas B. Habecker
Attorney, Agent, or Firm—Steven, Davis & Miller & Mosher

[57] ABSTRACT

In a device for the accurate measurement of the specific fuel consumption of internal combustion engines, which utilizes a scale having a pointer movable in front of a dial, the measuring scale carries detector or pick-up means comprising each a first transistorized oscillator circuit with a frequency modulated inductance-capacitance circuit, a second oscillator circuit generating a fixed reference frequency signal, a frequency changer receiving the first and second oscillator circuits signals, a low pass filter means to which is transmitted a reference frequency signal which corresponds to the difference of frequencies of the signals received by the frequency signal, a signal detector connected to the filter and rectifying through a doubler the HF voltage having passed through the filter and a shaping device connected to the output of the detector for delivering at a low impedance value a high-amplitude logic signal.

2 Claims, 2 Drawing Figures

DEVICE FOR MEASURING THE SPECIFIC CONSUMPTION OF INTERNAL COMBUSTION ENGINES

This is a division of application Ser. No. 43,790, filed June 5, 1970.

This invention relates to a device for measuring the specific fuel consumption, on a power-to-weight ratio, of internal combustion engines.

In a former patent in U.S. Pat. No. 3,448,609 of June 10, 1969, the Applicant describe a measuring device comprising an automatic scale adapted to weigh the consumed fuel contained in the measuring tank carried by the tray of this scale; the scale pointer is adapted, as it moves, to control the transmission of signals controlling in turn on the one hand the filling of said tank and on the other hand, during a uniform movement of the scale, the counting of the number of revolutions per minute of the engine and the time required for consuming a predetermined quantity of fuel.

In this device the scale dial carries twin-coil electromagnetic pick-ups adapted to create a field intersected by a metal plate secured normally to the scale pointer, the signals emitted by these pick-ups being received by electronic devices controlling the electromagnetic valve relay and revolution counters.

Hitherto known electromagnetic pick-ups utilized in this measuring system, as well as pick-ups of the mutual-induction variation type, of the photoelectric type and others used in different measuring systems are objectionable on account of their limited precision and stability, and require an extremely accurate mechanical construction, thus increasing their cost.

It is the essential object of the present invention to provide a device for accurately measuring the specific consumption of internal combustion engines which utilizes pick-up or like means for detecting the passage of the movable member and permits of attaining an extremely high degree of precision in the detection of the passage of the scale pointer, even at a high passage speed, without exerting any appreciable mechanical effect on the movable member to be detected, while being relatively easy and economical to manufacutre.

One embodiment of this invention is disclosed and claimed in my U. S. Pat. No. 3,720,934, of which this is a division.

The herein disclosed and claimed embodiment of the device for making accurate measurements is characterized in that the pick-ups, consisting as in the first form of embodiment of transistorized oscillators having a frequency-modulated inductance-capacity circuit, are remotely connected to at least one electronic detector comprising in cascade a frequency changer, a low-frequency low-pass filter, a detector consisting of a voltage doubler circuit, and a device for shaping the output logic signal, that the frequency-changer assembly of the device is connected to a local transistorized oscillator adapted to emit a signal at a predetermined fixed frequency, each frequency changer transmitting to its filter a signal representing the difference between said fixed frequency of said local oscillator and the variable frequency of the signal emitted by said pick-up.

The output of the frequency changer may consist of a signal containing the sum of the two frequencies $(f_0 + f_1)$ or their difference $(f_0 - f_1)$, $f_0$ designating the oscillator signal frequency and $f_1$ the frequency of the signal produced by the variable frequency pick-up.

By selecting a central frequency F of the low-frequency filter which is considerably lower than the frequency $f_0$ and $f_1$, only the components $f_0 - f_1$ of the signal issuing from the frequency changer are likely to have the same order of magnitude as $F$ and to pass through the filter.

If $\Delta F$ is the width of the pass-band of the filter for obtaining an output signal of the low-frequency band filter, it is necessary that $$f_0 - f_1 = F \pm \tfrac{1}{2} \Delta F$$

Therefore, $f_1$ must be equal to $(f_0 - F) \pm \tfrac{1}{2} \Delta F$ The selectivity of the assembly is:

$$\Delta F_1/f_1 = \Delta F/f_0 - F$$

Thus, assuming that $F = 1$ KHz, $\Delta F = 0.3$ KHz and $f_0 = 30,000$ KHz, a selectivity of about $10^{-5}$ is obtained which is higher than that of an ordinary quartz.

The device according to the present invention provides the following improvements in relation to the quartz system:

1. A higher precision of the release point;
2. a separation of the pick-up oscillator from the other parts of the electronic circuit, the connection being obtained through a coaxial cable;
3. the possibility of utilizing any frequency within the range of 1 to 100 MHz without resorting to a special quartz;
4. a simplification of the technological construction and in the adjustment thereof;
5. an improved temperature resistance;
6. a lower cost;
7. the possibility of switching by means of simple relays different pick-ups to a same detector device.

Figure 2:
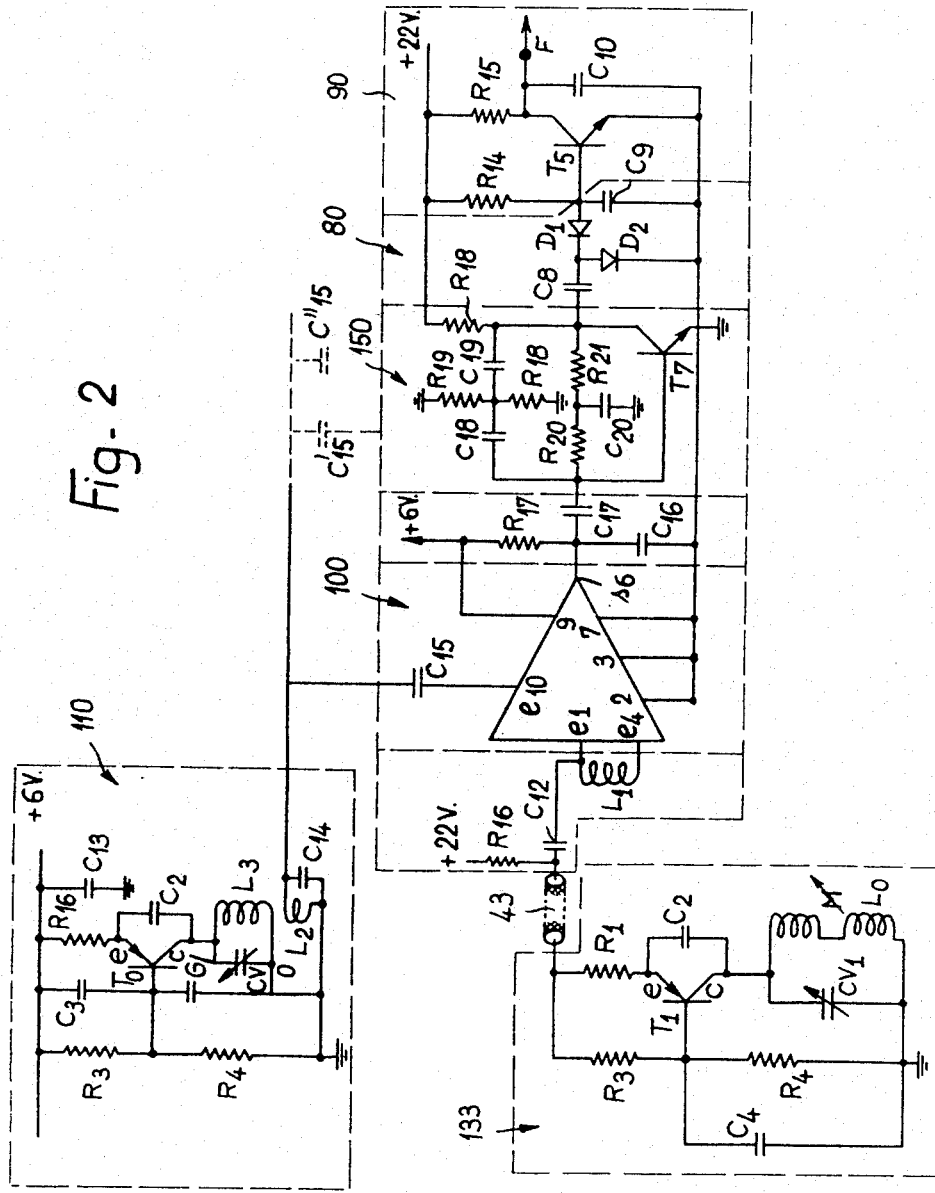

In order to afford a clearer understanding of this invention an embodiment thereof will now be described by way of example with reference to the attached drawing, in which:

FIG. 1 illustrates the block diagram of the complete detector assembly according to the present embodiment of this invention; and FIG. 2 illustrates the wiring diagram of the assembly of FIG. 1.

Referring to FIGS. 1 and 2, it will be seen that a pick-up oscillator 133 mounted on the dial (not shown) of the measuring scale is connected via a coaxial cable 43 to an electronic detector assembly comprising in succession, advantageously assembled on a common support, a frequency-changer amplifier 100 to which a local oscillator 110 is connected, then an active filter 150 for the low band-pass frequency, a voltage doubler detector circuit 80 and finally a stage 90 for shaping the high-amplitude logic signal delivered at a low impedance.

The pick-up oscillator 133 comprises as already known per se a inductance coil $L_0$ consisting of two half-coils, a variable air-type capacitor $C_1$ mounted in parallel with said inductance coil $L_0$ and forming therewith the oscillating circuit connected to the collector $c$ of a PNP-type transistor $T_1$ mounted with a common base, a feedback capacitor $C_2$ between the emitter $e$ and collector $c$ of said transistor, a ballast resistor $R_1$, a biasing and by-pass circuit consisting of a pair of resistors $R_3$ and $R_4$ with a capacitor $C_4$ across the terminals of resistor $R_4$. The pick-up oscillator is energized from a +22-Volt source via a coaxial cable 43 through a resistor $R_{16}$. The common points of resistor $R_4$, capacitor $C_4$, variable capacitor $CV_1$ and inductance coil $L_0$ are grounded.

During the variations of its inductance coil $L_0$ the pick-up oscillator 133 emits a signal having a frequency $f_1$, for example of less than 30 MHz. This signal is directed via cable 43 through a capacitor $C_{12}$ connected to a reactor $L_1$ so as to be displayed at the inputs $e_1$ and $e_4$ of the frequency-changer amplifier 100 of the integrated circuit type.

As the pick-up circuit 133 is independent of the other elements of the detector assembly, a plurality of pick-ups in a same detector assembly can be switched by using simple electromagnetic relays (not shown in the drawing).

The local oscillator 110 comprises a transistor $T_0$ also of the PNP type, mounted on a common base. The oscillating circuit consists of a variable capacitor $CV_0$ mounted, in parallel with an inductance coil $L_3$, between the collector $c$ of transistor $T_0$ and the ground. The biasing and by-pass circuit consists of resistors $R_3$, $R_4$, and capacitors $C_3$, $C_4$. The +6-Volt power supply is directed through a ballast resistor $R_{16}$, with a capacitor $C_{13}$ connected in parallel between this resistor and the ground. A feedback capacitor $C_2$ is mounted between the collector $c$ and emitter $e$ of transistor $T_0$. The oscillator emits a signal of fixed frequency $f_0$, for example of 30 MHz, adjustable by means of the variable capacitor $CV_0$. The coupling of the oscillating circuit with the frequency changer 100 takes place through the coupling coil $L_2$ having a capacitor $C_{14}$ connected across its terminals. The common point of resistor $R_4$ and variable capacitor $CV_0$, on the one hand, and coupling coil $L_2$, on the other hand, is grounded.

The local oscillator 110 transmits a signal, say of the order of 30 MHz, through a capacitor $C_{15}$, to another input $e_{10}$ of frequency changer 100. The same oscillator may be connected to several detector circuits through capacitors $C'_{15}$, $C''_{15}$, etc. . . .

The output $s_6$ of frequency changer circuit 100 is fed with a +6-Volt current through a resistor $R_{17}$ as is by-passed by a grounded capacitor $C_{16}$, whereby the signal resulting from the difference between $f_0$ and $f_1$ can be obtained directly. This +6-Volt supply is also connected to a terminal 9 of said frequency changer; the compensation terminals 2, 3, 7 are grounded. The frequency changer 100 is also connected to the input of the low-frequency filter through a capacitor $C_{17}$.

The low-frequency filter 150 is an active filter consisting of a selective amplifier. This amplifier comprises an NPN-type transistor $T_7$ loaded through a resistor $R_{18}$ from a +22-Volt current source. The feedback network of this filter consists of a double T bridged by a transistor $T_7$. The first T comprises two capacitors $C_{18}$ and $C_{19}$ in series, having their common point connected to resistors $R_{19}$ and $R_{20}$ having their other terminals grounded.

The detector 80 receiving the signal from the filter consists of a pair of series-connected diodes $D_1$ and $D_2$ having their common point connected in turn via a capacitor $C_8$ to the filter output. The diode $D_2$ is grounded; the other diode $D_1$ transmitting the rectified signal to the shaping stage 90 is connected to a grounded capacitor $C_9$.

This last-mentioned shaping stage 90 emitting a high-amplitude logic signal at its output G comprises an NPN-type transistor $T_5$, a ballast resistor $R_{15}$ connected to the +22-Volt current source and coupled with a capacitor $C_{10}$. Another resistor $R_{14}$ connected to the +22-Volt source, possibly in series with an adjustment potentiometer (not shown), controls the biasing of transistor $T_5$. The latter operates under the impulse condition, by being alternately conducting and saturated.

Although the above description and the accompanying drawing illustrates a typical embodiment of the present invention, it will be readily understood by those conversant with the art that various modifications and changes may be brought thereto without departing from the basic principles of the invention as set forth in the appended claims.

I claim:

1. A pick-up device for detecting the movement of a scale assembly movable member of an apparatus for accurately measuring the specific fuel consumption of internal combustion engines, said device comprising:

a movable metal member rigid with said scale assembly movable member;

generating means coupled with said movable metal member for generating signals of which the frequency is a function of movement of said movable member, said generating means comprises a first transistor oscillator circuit having an inductance-capacitance tuned circuit cooperating with said movable member to vary one of the elements of said tuned circuit;

second transistor oscillator circuit means comprising an inductance-capacitance tuned circuit, for generating a fixed reference frequency signal;

a frequency changer circuit having first and second inputs coupled with the outputs of said generating means and second oscillator circuit means, respectively, said frequency changer circuit comprising means for generating a signal having a frequency which is the difference between the signal generated by said generating means and said reference frequency signal;

low pass filter means coupled with the output of said frequency changer circuit comprising an R-C filter circuit coupled to a transistor;

detecting and rectifying means coupled with the output of said filter means for detecting and rectifying the output signal thereof, said detecting and rectifying means comprising two series-connected diodes, the output of said low pass filter being connected to the junction of said diodes; and signal shaping means coupled with the output of said detecting and rectifying means for shaping the output signal thereof into a series of low impedance high amplitude pulse signals.

2. A pick-up device according to claim 1, further comprising a coaxial cable coupling the output of said generating means to said first input of said frequency changer circuit.

* * * * *